United States Patent
Larsen et al.

(10) Patent No.: US 6,535,391 B2
(45) Date of Patent: Mar. 18, 2003

(54) CAGE ASSEMBLY FOR FRONT SERVICE ACCESS AND METHOD OF USE

(75) Inventors: Kenneth Carl Larsen, Georgetown, TX (US); Benjamin Michael Kreuz, Austin, TX (US); Francis Anthony Kuchar, Jr., Pflugerville, TX (US); Donald Lee Thompson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/843,067

(22) Filed: Apr. 26, 2001

(65) Prior Publication Data

US 2002/0159241 A1 Oct. 31, 2002

(51) Int. Cl.[7] ............................... H05K 7/16; H05K 5/00
(52) U.S. Cl. ..................... 361/727; 361/724; 312/223.1
(58) Field of Search ................................. 361/724–727, 361/752–756, 769, 796, 802; 211/41.17, 41.18, 70.1, 71.01, 72–73; 312/223.1, 223.3; 400/713, 714

(56) References Cited

U.S. PATENT DOCUMENTS

| | | | | | |
|---|---|---|---|---|---|
| 2,857,558 | A | * | 10/1958 | Fiske | 361/727 |
| 5,745,342 | A | * | 4/1998 | Jeffries | 361/683 |
| 6,007,358 | A | * | 12/1999 | Nagase | 439/327 |
| 6,104,621 | A | * | 8/2000 | Weadon | 361/814 |
| 6,219,249 | B1 | * | 4/2001 | Tuccio | 361/724 |

* cited by examiner

*Primary Examiner*—David Martin
*Assistant Examiner*—Michael L. Lindinger
(74) *Attorney, Agent, or Firm*—Sawyer Law Group LLP

(57) ABSTRACT

A system and method for front service access to a component or subassembly in a computer system is disclosed. In a preferred embodiment of the present invention, a frame having a front face is provided, as well as a plate configured to move into and out of the front face of the frame. The plate includes a first portion and a second portion coupled to one another via a linking element. A component cage is mounted on the first portion of the plate. The first portion of the plate is moved out of the front face of the frame and is rotated downward via the linking element. In this position, the cage is readily accessible.

28 Claims, 11 Drawing Sheets

100

100

CAGE ASSEMBLY FOR FRONT SERVICE ACCESS AND METHOD OF USE

FIELD OF THE INVENTION

The present invention relates to computer system components and more particularly to a system and method of use for front service access to a component or subassembly in a computer system.

BACKGROUND OF THE INVENTION

Modern computer/server systems typically incorporate a host of components that determine the system's functionality and speed. At one time, a comparable computing system would have occupied an entire room. Now, the computer/server systems are, for the most part, self-contained units that can be mounted in a standard rack. The components are arranged in a, compact package in a mechanical chassis within the computer/server. These components can be direct access and storage devices (DASDs), e.g., hard disk drives, processors, or power supplies. The components are generally connected to each other and to the system via cables, printed circuit boards, or planars. If a component needs repair or replacement, it is usually removable from within the chassis once the computer's cover has been removed. Removal often requires disconnecting the cables from the rear of the component or subassembly before extracting the component.

Component extraction is generally easy if the components are arranged in a single level. In that situation, once the cover is removed from the computer system, the components are accessible through the top of the system. Nevertheless, with the increased number of components being installed in computers, single level storage may not be feasible. In fact, multi-level arrangements are not uncommon. Although more components can be accommodated in this fashion, access to those components buried beneath others can be difficult, if not impossible. Removing the computer's cover no longer exposes all the components.

For instance, if a faulty component or subassembly is mounted in the lower front corner of a multi-level chassis, it may be difficult or impossible to reach the associated cable(s) from the top of the system. Other components mounted above the faulty part might have to be removed in order to gain access. This introduces a new level of potential error because now several components must be disconnected and reconnected, opening the door to mistakes that might harm the system. Although extraction through the front, as opposed to the top, of the chassis might be feasible, it is difficult to completely extract an electrical component or subassembly through the front of a rack-mounted system and then attempt to disconnect the cables.

For example, FIGS. 1 and 1A illustrate a typical mechanical chassis 12 for a two level DASD cage assembly in a computer system 10. As shown, there are two DASD cages 14a and 14b within the chassis 12, each accommodating up to six DASD drives 16. Both cages 14a and 14b also include a backplane card 18a located at the back of the cage 14a, 14b. With the top cover 10a removed in FIG. 1A, the upper cage 14a is exposed. The backplane card 18a at the rear of the upper DASD cage 14a can be easily unplugged and removed from the cage 14a through the top of the system 10. The lower DASD cage 14b is completely obscured by the upper cage 14a, and the lower back plane (not shown) is inaccessible, unless the upper DASD cage 14a is removed. Removing the upper DASD cage 14a requires removing the DASD drives 16 and disconnecting the cables leading to the backplane card 18a. This process is time consuming and tedious, presents a potential situation for erroneously disconnecting or reconnecting a cable, and may damage otherwise functional components.

Therefore, what is needed is a system and method for accessing a component or subassembly from the front of the computer system. The system and method should provide easy access to the component or subassembly so that a user can readily disconnect and reconnect cables. The system and method should also be easily adapted to existing computer systems. The present invention addresses such needs.

SUMMARY OF THE INVENTION

A system and method for front service access to a component or subassembly in a computer system is disclosed. In a preferred embodiment of the present invention, a frame having a front face is provided, as well as a plate configured to move into and out of the front face of the frame. The plate includes a first portion and a second portion coupled to one another via a linking element. A component cage is mounted on the first portion of the plate. The first portion of the plate is moved out of the front face of the frame and is rotated downward via the linking element. In this position, the cage is readily accessible.

In accordance with the preferred embodiment of the present invention, a user can readily access the component or subassembly from the front side of the computer system. Connector cables attached to the component can be removed easily without the risk of removing the wrong cable or connecting a cable into the wrong receptor. Accordingly, the present invention simplifies repairs and upgrades to computer systems, thereby increasing efficiency and reducing costs.

DETAILED DESCRIPTION

The present invention relates to a system and method for accessing the rear of a component or subassembly from the front of the computer system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention provides a system and method for front side access to a component or subassembly in a rack-mounted computer/server system. The system in accordance with the present invention is presented in the context of a preferred embodiment. The preferred embodiment is directed to a DASD drive cage assembly with the drive-docking backplane card mounted to the rear of the assembly. A person skilled in the art will readily recognize, however, that the basic principles disclosed herein can be applied to any electronic component or subassembly similarly mounted, and that the present invention is by no means limited to the preferred embodiment.

Figure 1:
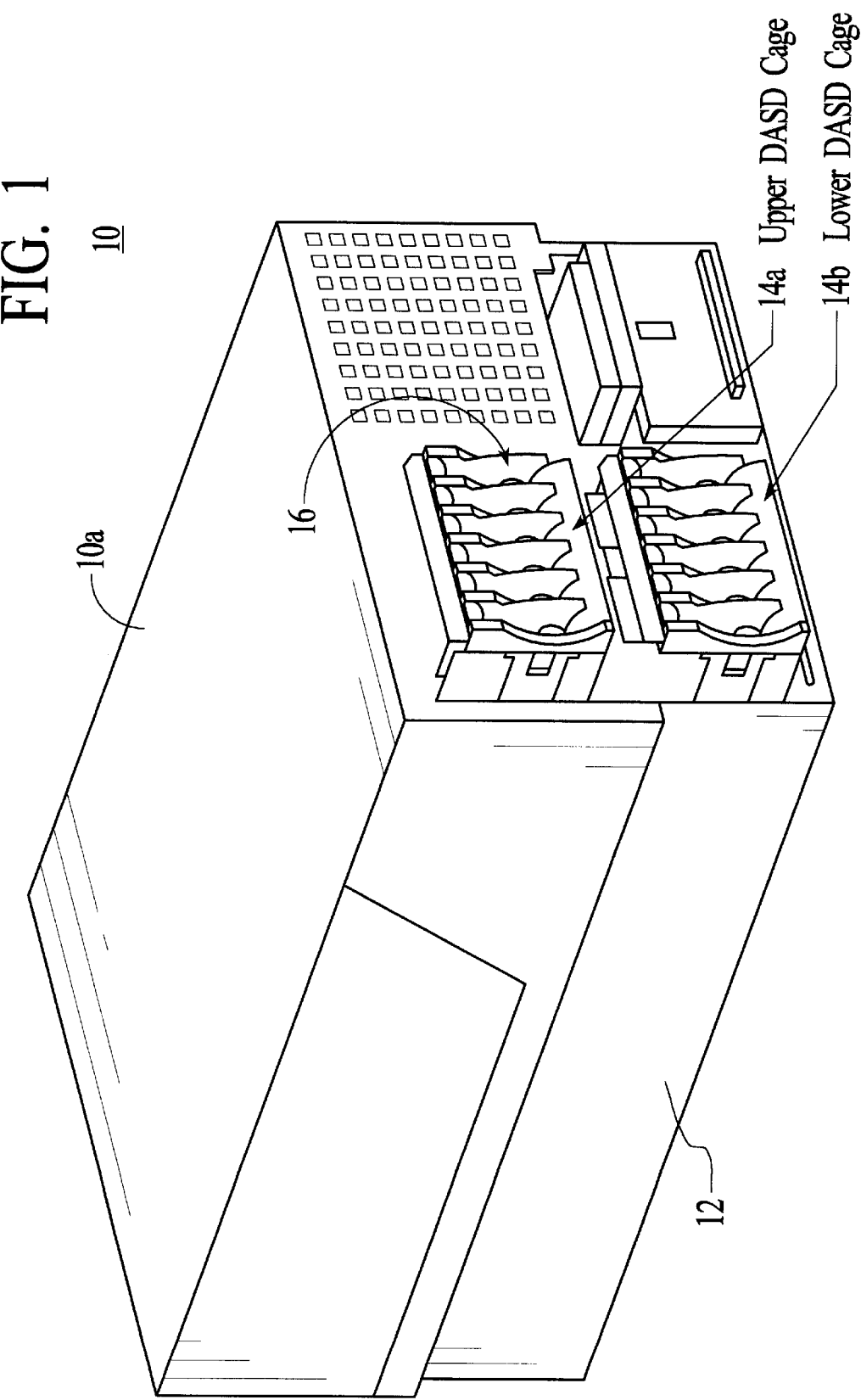
FIG. 1 illustrates a typical mechanical chassis for a two level DASD cage assembly in a computer system.
Figure 1A:
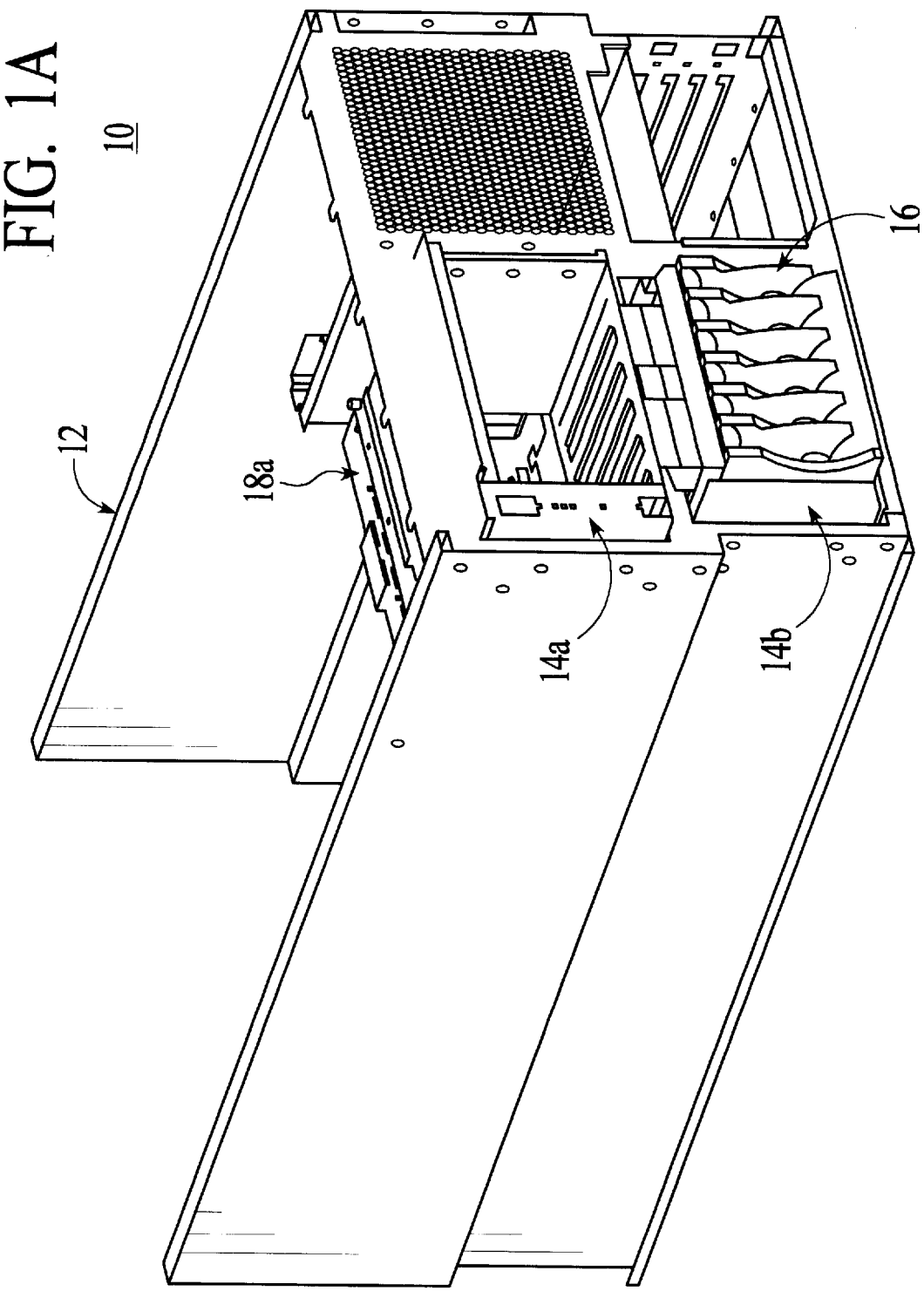
FIG. 1A illustrates the cage assembly of FIG. 1 with the cover removed.
Figure 2:
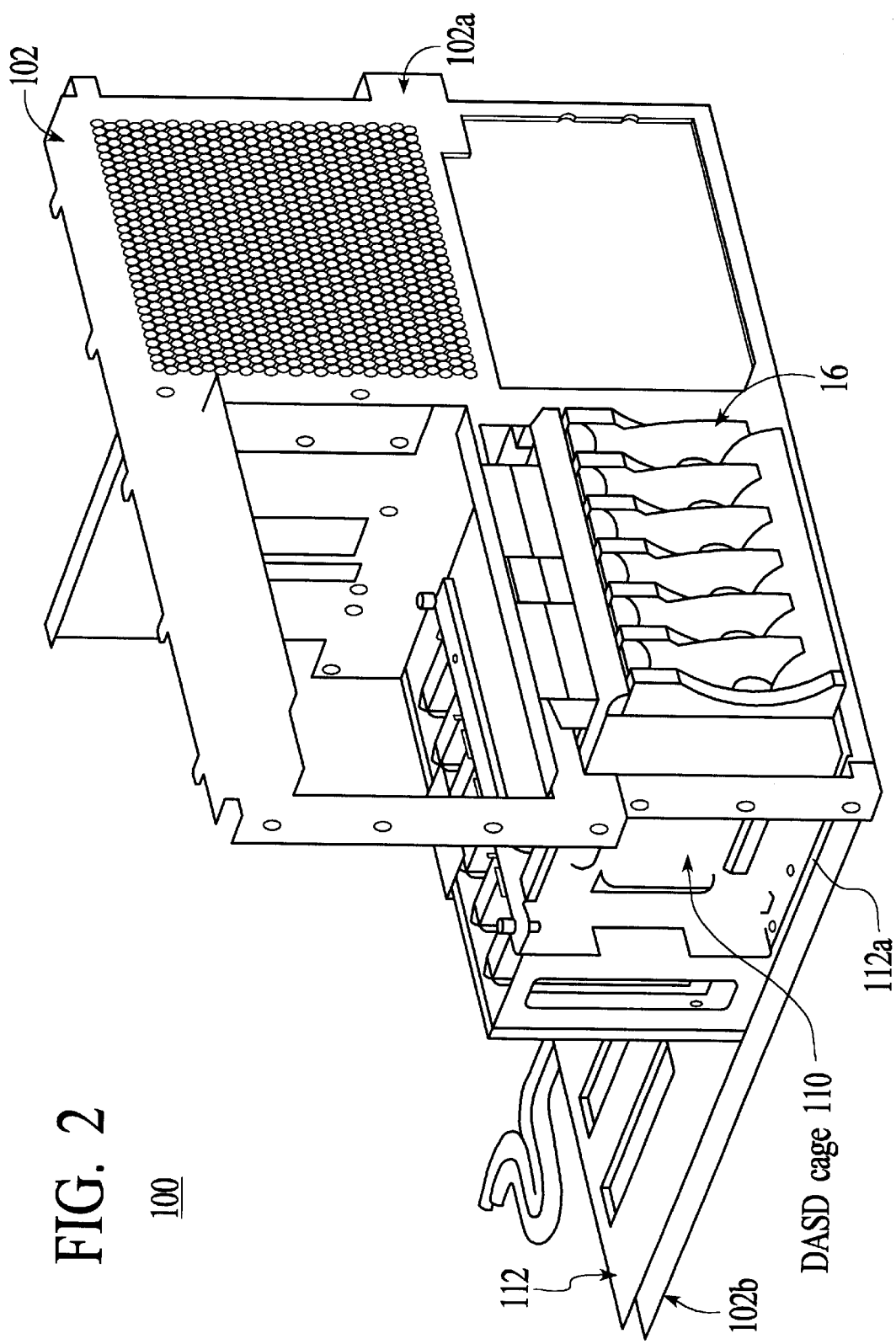
FIG. 2 is an isometric view from the front of the DASD cage assembly in accordance with the preferred embodiment of the present invention.

FIG. 2 is an isometric view of a two level DASD cage assembly 100 in accordance with the preferred embodiment of the present invention. The cage assembly 100 is intended to fit within the chassis 12 of the computer system (not shown). The cage assembly 100 includes a frame 102 which supports an upper DASD cage (not shown) and a lower DASD cage 110. As is shown, the frame has a front face 102a with two openings corresponding to the upper cage and lower cage 110, and a bottom face 102b beneath the lower DASD cage 110. For purposes of clearly illustrating the features of the present invention according to the preferred embodiment, the upper DASD cage will not be shown.

The cage assembly 100 also includes a plate 112 which fits over the bottom surface of the frame 102b. The plate 112 is capable of sliding into and out of the frame 102a through the opening corresponding to the lower DASD cage 110. The plate 112 also comprises a front portion 112a and a back portion 112b, whereby the lower DASD cage 110 is mounted on the front portion 112a of the plate 112 to form a plate/cage (112a/110) combination. As the plate 112 slides into and out of the frame 102a, the lower cage 110 also slides into and out of the corresponding opening in the frame 102.

Figure 3A:
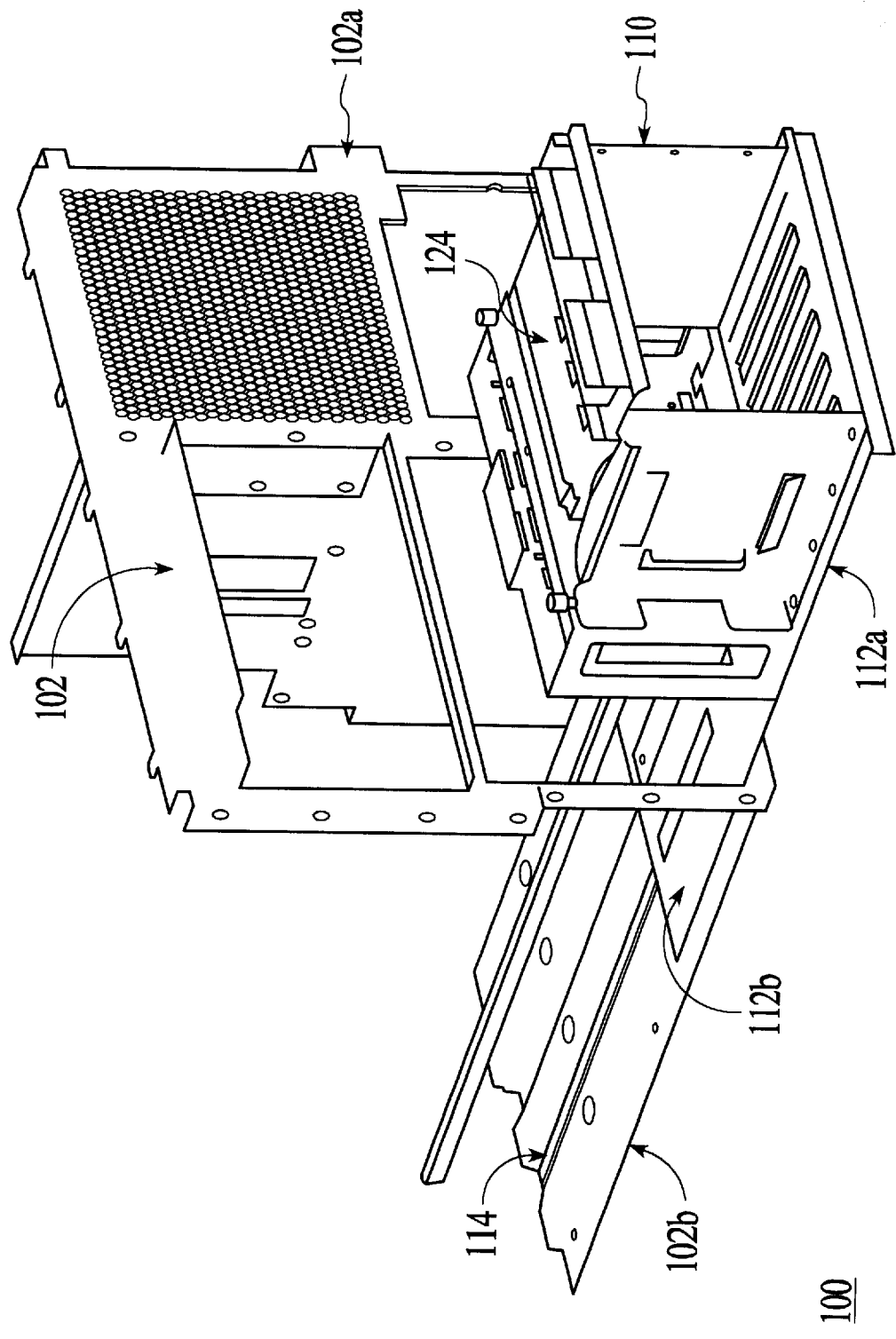
FIG. 3A illustrates the DASD cage assembly in accordance with a preferred embodiment of the present invention with the DASD cage in an extended position.

Referring now to FIG. 3A, illustrated is an isometric view of the DASD cage assembly 100 with the plate/cage (112a/110) combination outside of the frame 102. As is shown, the lower cage 110 is completely outside of the frame 102, while the back portion 112b of the plate 112 remains within the frame 102. This configuration is referred to as an extended position. Note also that the DASD drives 16 have been removed from the cage 110. In a preferred embodiment, the plate 112 is prevented from sliding into the extended position if at least one DASD drive 16 remains in the cage 110. This feature will be discussed in more detail below.

FIG. 3A also reveals that the plate 112 preferably is guided into and out of the front of the frame 102a via at least one guide rail 114. In a preferred embodiment, the guide rails 114 are provided on the bottom face of the frame 102b, and the plate 112 is adapted to slide on top of the guide rails 114. One of ordinary skill in the art, however, would appreciate that the guide rails 114 could be mounted on a different surface of the frame, such as a side surface, or the rails 114 could be incorporated into a platform piece which fits within the computer housing. The point is that the plate 112 moves into and out of the front of the frame 102a via the guide rails 114, thereby allowing front side access to the lower cage 110.

Figure 3B:
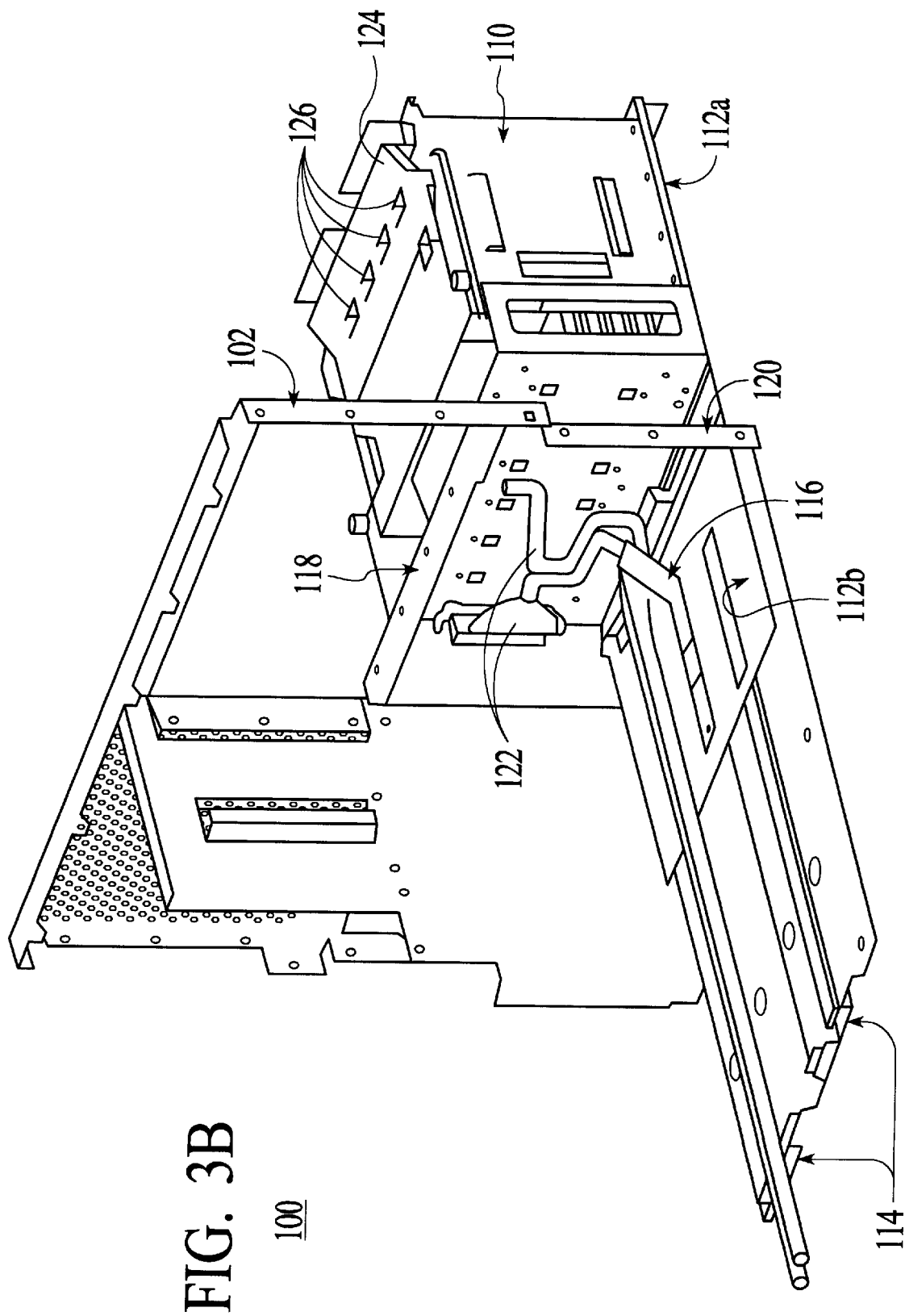
FIG. 3B illustrates the DASD cage assembly in accordance with a preferred embodiment of the present invention in the extended position viewed from the back of the system.

FIG. 3B illustrates a rear isometric view of the DASD cage assembly 100 as shown in FIG. 3A, wherein the plate/lower cage 112a/110 combination is in the extended position. A linking element couples the front portion of the plate 112a with the back portion of the plate 112b. The linking element allows the front portion of the plate 112a to rotate relative to the back portion of the plate 112b, and is preferably a hinge assembly 120. In the extended position, the linking element is outside of the frame 102 along with the DASD cage 110 and front portion of the plate 112a. A stop removal spring 116 mounted on the back portion of the plate 112b locks the plate 112 in place when it is in the extended position. Thus, when the components are being serviced, the DASD cage 110 and plate 112 are stable and supported by the frame 102. FIG. 3B also illustrates the backplane assembly 118 mounted to the back of the lower DASD cage 110, and a plurality of connectors 122 attached thereto.

Figure 4A:
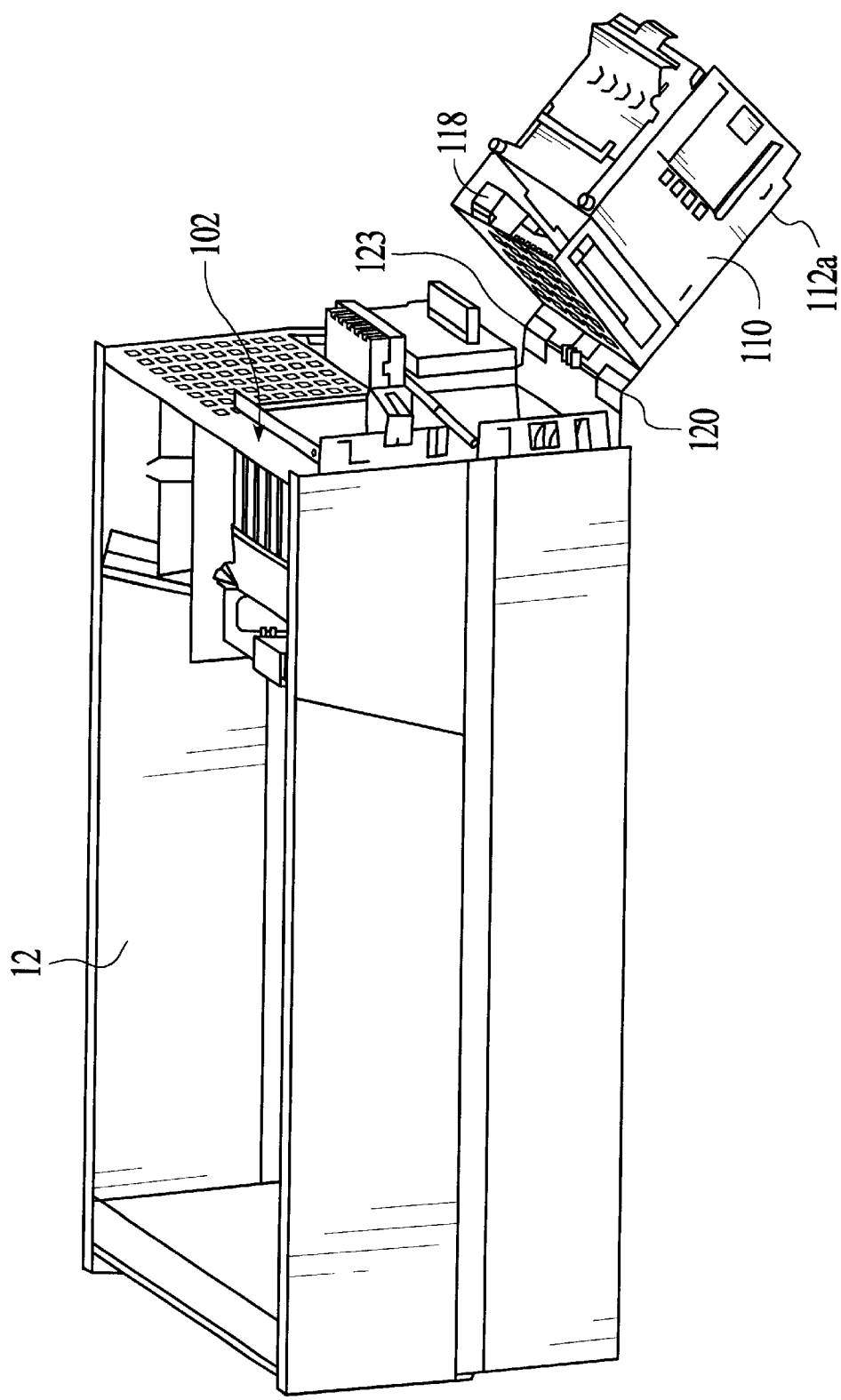
FIGS. 4A, 4B, and 4C provide perspectives from the side, front and back of the DASD cage assembly in accordance with the preferred embodiment of the present invention with the DASD cage assembly in the service position.
Figure 4B:
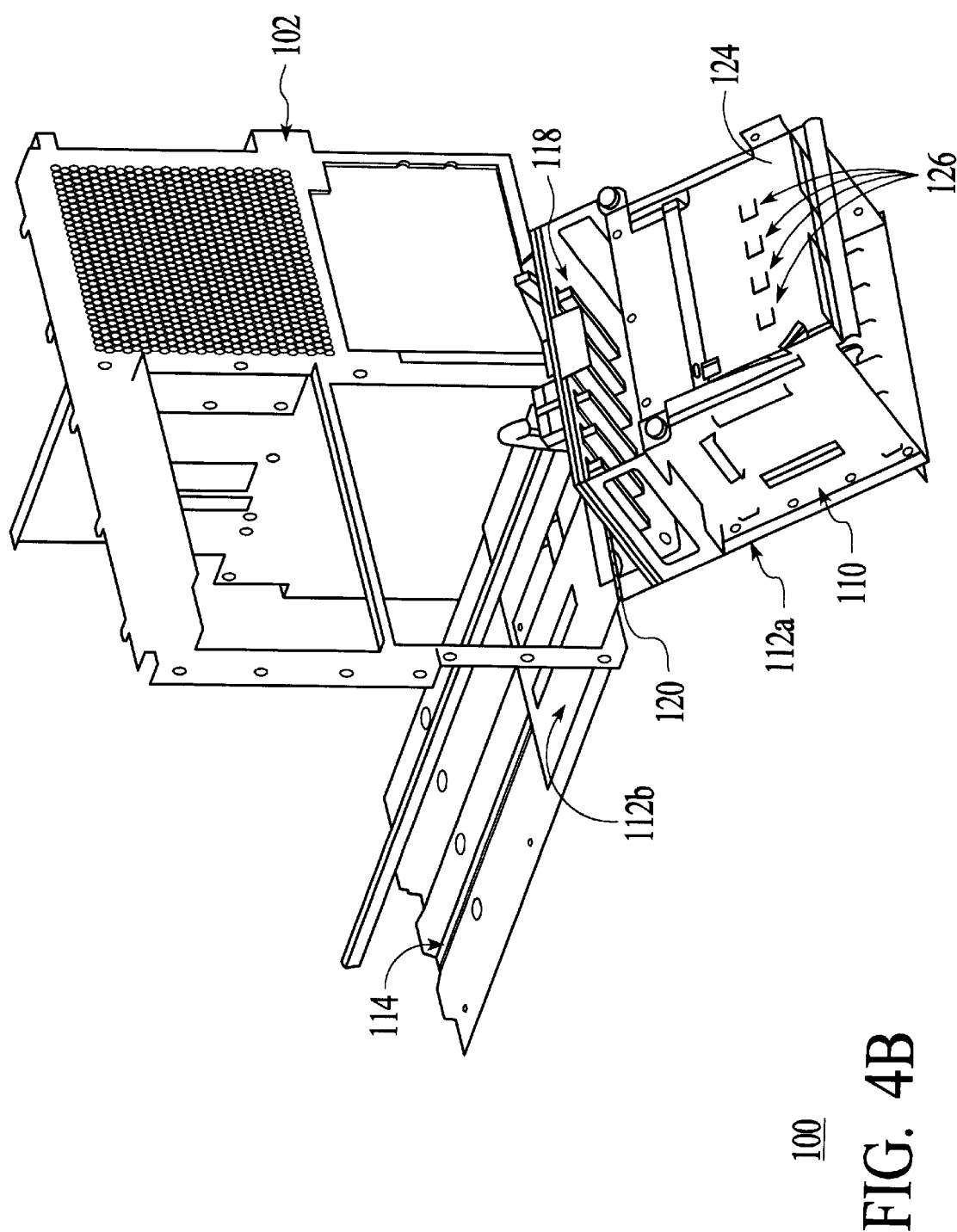
Figure 4C:
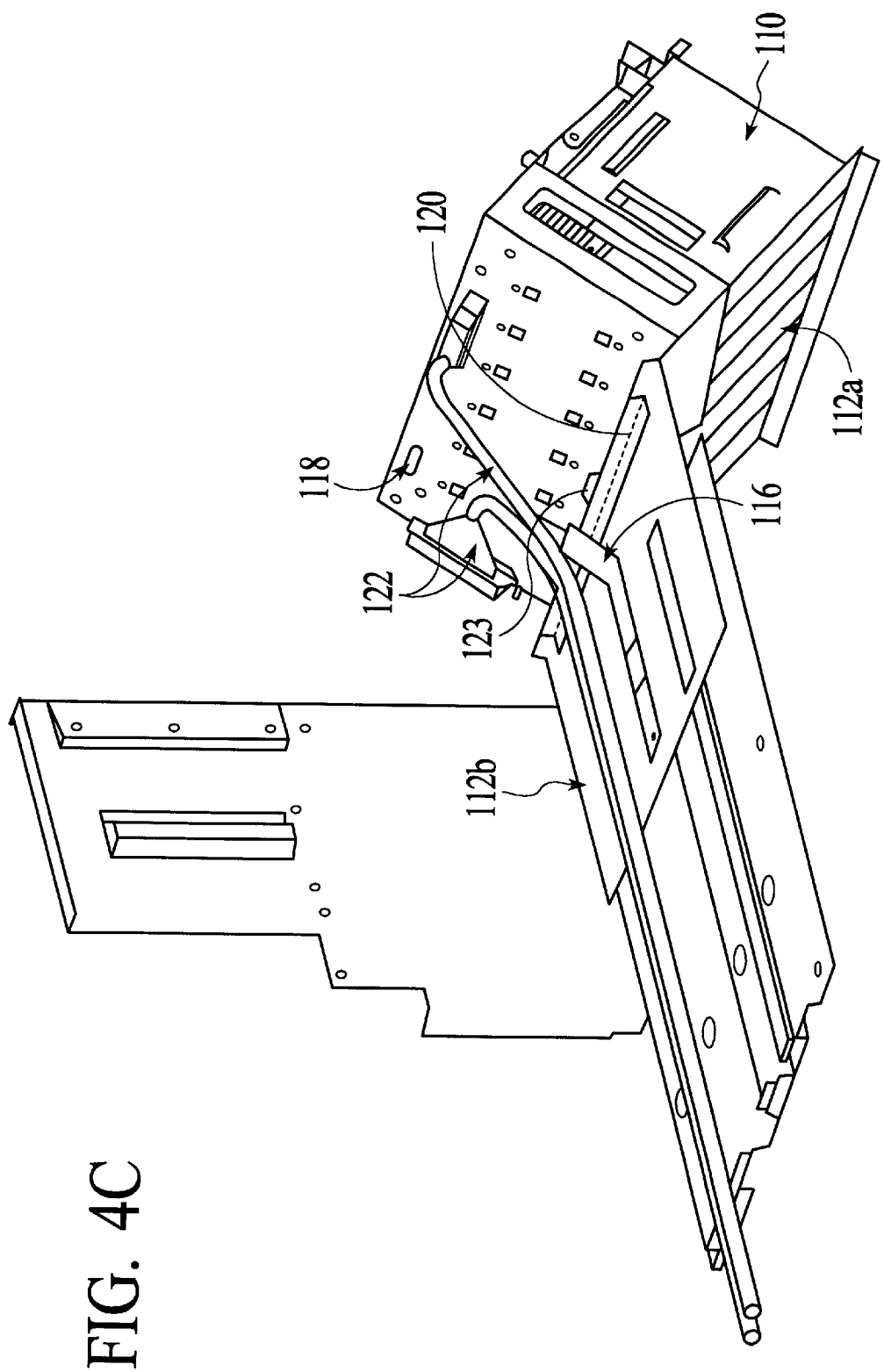

In FIGS. 4A, 4B and 4C, isometric views from the side, front and back of the DASD cage assembly 100 are provided wherein the DASD cage assembly 100 is in the service position. FIG. 4A illustrates the DASD cage assembly 100 mounted in the chassis 12. As is shown, the backplane assembly 118 and connectors 122 are easily accessible when the lower DASD cage 110 is rotated downward via the hinge assembly 120. Because the back portion of the plate 112b remains within the frame 102 and is locked in place by the cage removal spring 116, the lower DASD cage 110 is stable. In a preferred embodiment, the hinge assembly 120 is adapted to allow the front portion of the plate 112a to rotate downward approximately 45 degrees. The hinge assembly 120 also preferably includes a detent mechanism 123 to prevent the plate/cage 112a/110 combination from rotating until moderate force is applied to overcome the detent and allow the plate/cage 112a/110 combination to pivot downward to the service position. In the service position, the backplane assembly 118 is easily accessible from the front of the system.

As stated above, in a preferred embodiment, the plate 112 is prevented from sliding out of the frame 102 and into the extended position if at least one DASD drive 16 remains in the cage 110. Referring again to FIG. 3B, a spring latch mechanism 124 is provided on top of the DASD cage 110. The spring latch mechanism 124 includes a plurality of tabs 126 located above the DASD drives 16. The tabs 126 extend down into the DASD cage 110, such that when at least one DASD drive 16 is in the cage 10, the drive 16 will force a tab 126 above it to move the spring latch mechanism 124 into a locked position. When the spring latch mechanism 124 is in the locked position, the cage 110 is prevented from sliding out of the frame 102 and into the extended position.

Figure 5:
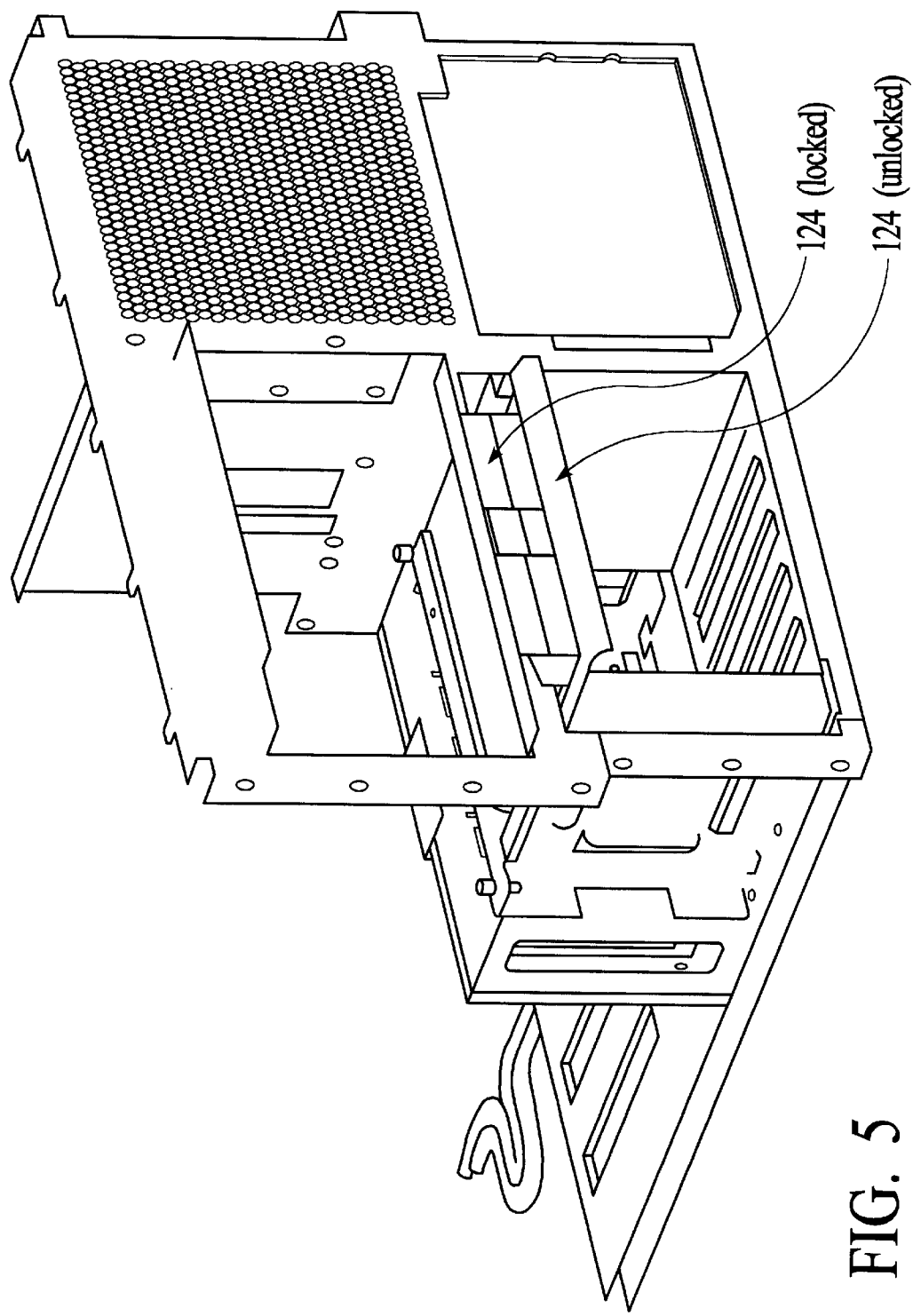
FIG. 5 illustrates the DASD cage in accordance with the preferred embodiment of the present invention with the spring latch mechanism in the locked and unlocked positions.

When all drives 16 have been removed from the cage 110, the plurality of tabs extend into the DASD cage 110 unimpeded and the spring latch mechanism 124 can lie flush with the top of the DASD cage 110. In this position, the cage 110 is free to slide out of the frame 102. FIG. 5 is an isometric view that illustrates the DASD cage 110 with the spring latch mechanism 124 in the locked and unlocked positions.

Figure 6:
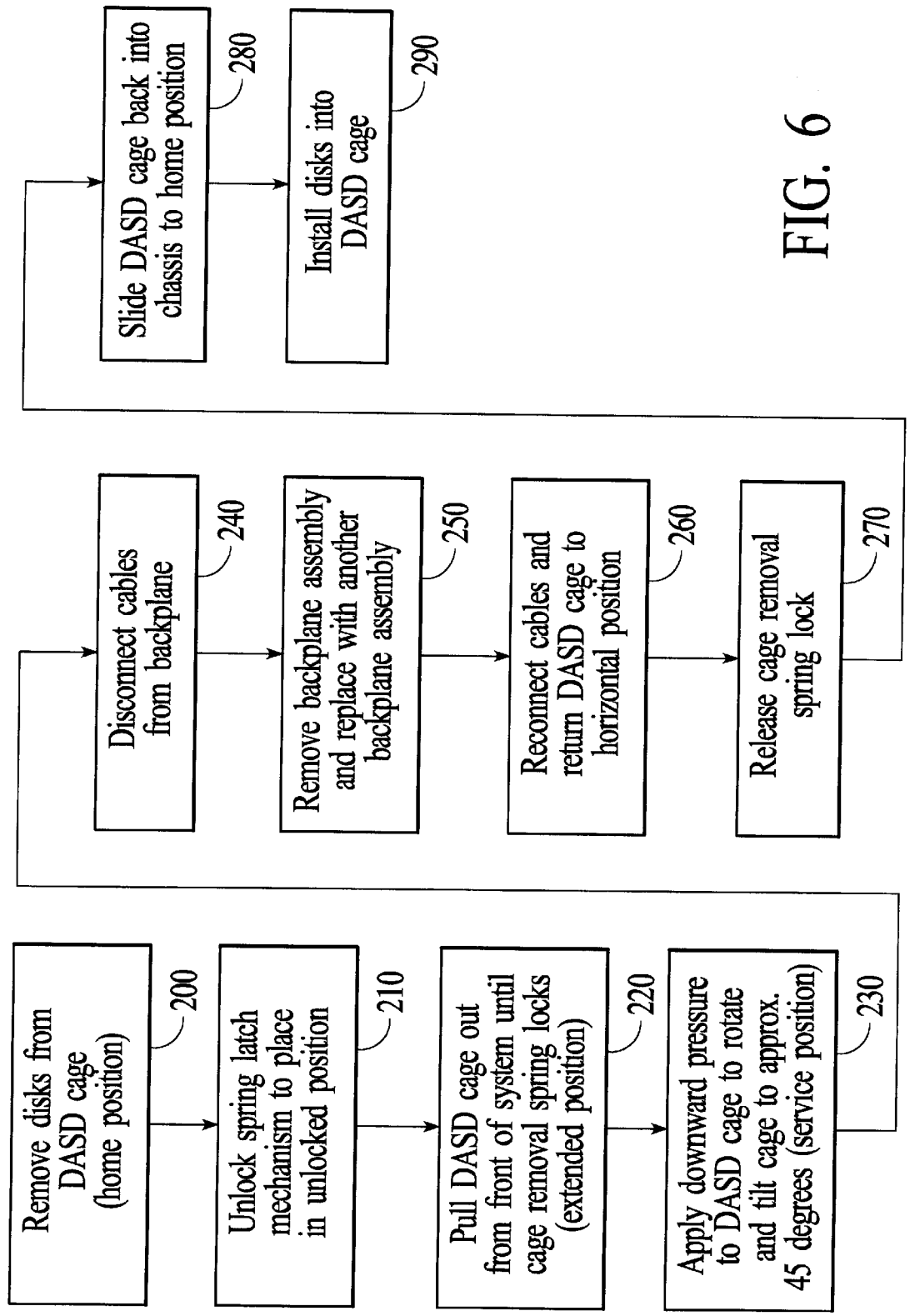
FIG. 6 is a flow chart illustrating a method for replacing the backplane assembly in accordance with the present invention.

FIG. 6 is a flow chart illustrating a method for replacing the backplane assembly 118 in accordance with the preferred embodiment of the present invention. The first step of the method is removing the DASD disks 16 from the lower DASD cage 110, via step 200. Next, in step 210, the spring latch mechanism 124 is released into the unlocked position so that the DASD cage 110 can be moved from its home position to an extended position. The DASD cage 110 is then pulled out of the front of the frame 102a, via step 220, until the cage removal spring 116 locks the back portion of the plate 112b in place. The DASD cage 110 and front portion of the plate 112a are now in the extended position, wherein the DASD cage 110 can be rotated downward and tilted approximately 45 degrees by applying downward pressure to the cage 110, via step 230. The plate/cage 112a/110 combination is now in the service position.

Figure 7:
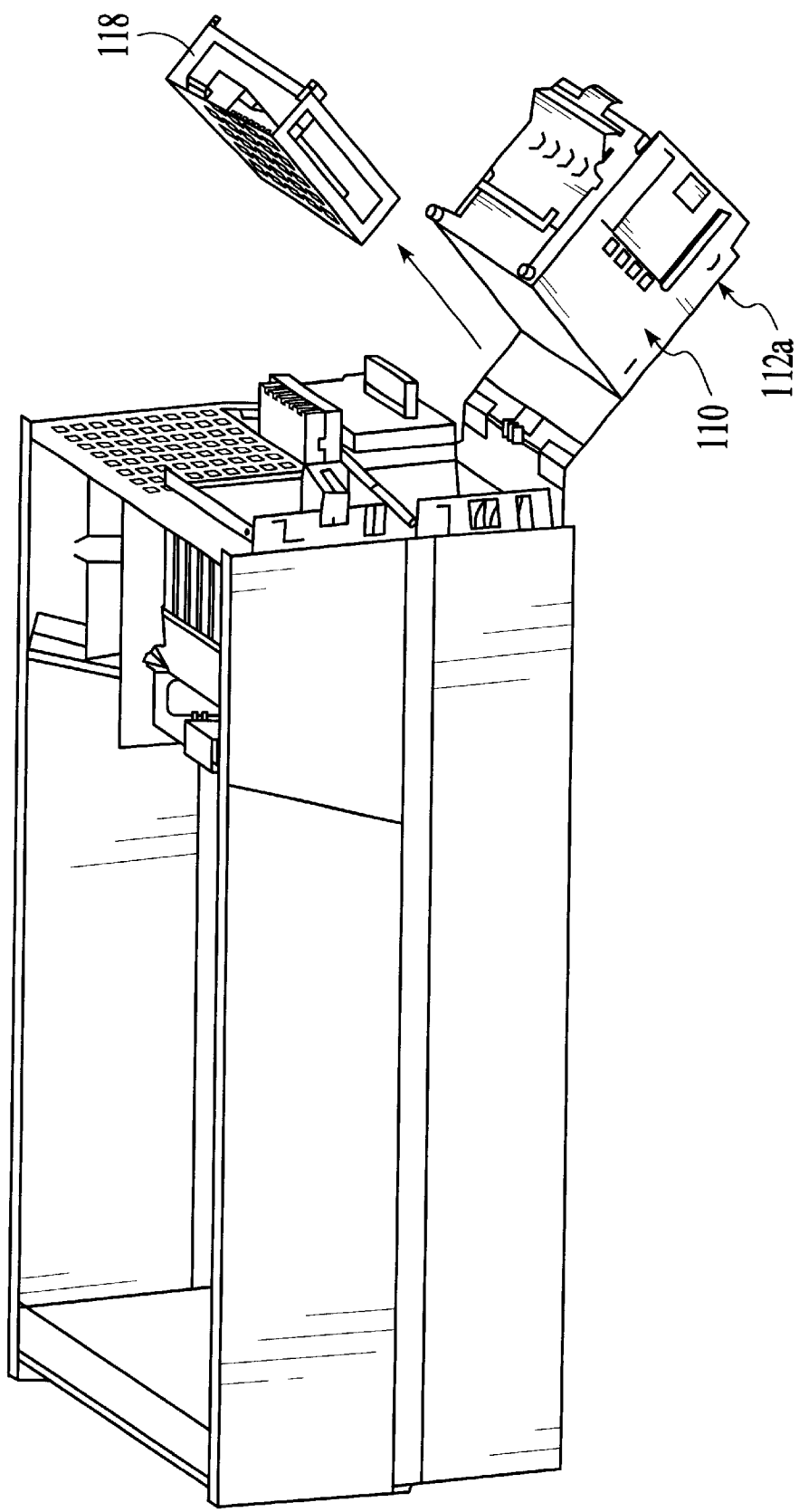
FIG. 7 illustrates the DASD cage/plate combination in accordance with the preferred embodiment of the present invention in the extended position and the backplane assembly being removed.

Next, the user can easily disconnect connectors 122 from the backplane assembly 118 in step 240, and remove and replace the backplane assembly 118 in step 250. FIG. 7 illustrates the plate/cage 112a/110 combination in the service position and the backplane assembly 118 being removed. Referring again to FIG. 6, in step 260, the connectors 122 are reconnected to the backplane assembly 118 and the DASD cage 110 is returned to its horizontal position. The cage removal spring 116 is released, either manually or by pushing the plate/cage 112a/110 combination in a direction into the frame 102, via step 270. The DASD cage 110 is pushed back into the frame 102 to its home position, via step 280, and the DASD disks 16 are reinstalled into the cage 110 in step 290.

In accordance with the preferred embodiment of the system and method of the present invention, a user can readily access the rear portion of the lower device cage from the front side of the computer system. Because the lower cage slides out of the frame, there is no need to remove other components surrounding the cage assembly such, as the upper cage. The connector cables attached to the component can be removed easily without the risk of removing the wrong cable or connecting a cable into the wrong receptor. The present invention is easily adaptable to existing computer systems and requires little effort to modify the lower DASD cage and frame. Accordingly, the present invention simplifies repairs and upgrades to computer systems, thereby increasing efficiency and reducing costs.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A cage assembly for use in a computer system, comprising:
   a frame having a front face;
   a plate, the plate having a first portion and a second portion;
   a linking element for coupling the first portion to the second portion of the plate, wherein the linking element is a hinge assembly; and
   a cage for receiving a plurality of components, the cage mounted on the first portion of the plate, wherein the first portion of the plate is capable of moving out of the front face of the frame and rotating, such that the cage is accessible.

2. The assembly of claim 1 further comprising at least one guide rail mounted on the frame, wherein the plate is coupled to the at least one guide rail and slides into and out of the frame on the at least one guide rail.

3. The assembly of claim 1, wherein the hinge assembly allows the first portion of the plate to rotate from a first position to a second position.

4. The assembly of claim 3, wherein the hinge assembly includes a detent mechanism, wherein the detent mechanism prevents the first portion from rotating to the second position until pressure is applied to the first portion of the plate.

5. The assembly of claim 4, wherein the second position being 45 degrees from horizontal.

6. The assembly of claim 1, wherein the cage includes a front side and a back side.

7. The assembly of claim 6, wherein the cage is a direct access and storage device (DASD) drive cage with a backplane card mounted in the back side and a plurality of hard disk drive (HDD) devices mounted in the front side.

8. The assembly of claim 7, further including a spring latch mechanism mounted to the cage, the spring latch mechanism for preventing the cage from moving out of the frame if at least one HDD device is mounted in the front side of the cage.

9. The assembly of claim 1, further including a cage removal spring mounted on the second portion of the plate, wherein the cage removal spring locks the second portion of the plate in place when the first portion of the plate is outside of the frame.

10. A method for accessing a component mounted in a device cage, comprising the steps of:
   a) providing a frame having a front face;
   b) providing a plate, the plate having a first portion and a second portion, wherein the first portion of the plate can move into and out of the front face of the frame;
   c) coupling the first portion to the second portion via a linking element, wherein the linking element is a hinge assembly;
   d) mounting the device cage on the first portion of the plate, wherein a front side of the cage faces the front face of the frame;
   e) moving the first portion of the plate out of the first face of the frame such that the device cage is outside of the frame; and
   f) accessing the component mounted in the device cage by rotating the first portion of the plate downward via the linking element.

11. The method of claim 10, wherein the moving step (e) further includes:
   (e1) mounting at least one guide rail on the frame;
   (e2) coupling the plate to the at least one guide rail; and
   (e3) sliding the plate along the at least one guide rail.

12. The method of claim 11, wherein moving step (e) further includes:
   (e4) locking the plate in place when the first portion of the plate is outside of the frame by activating a cage removal spring mounted on the second portion of the plate.

13. The method of claim 10, wherein accessing step (f) further includes:
   (f1) rotating the first portion of the plate from a first position to a second position.

14. The method of claim 13, wherein the hinge assembly includes a detent mechanism, and rotating step (f1) further includes:
   (f1a) while in the first position, applying pressure to the first portion of the plate in order to overcome the detent, thereby allowing the first portion to rotate to the second position.

15. The method of claim 14, wherein the second position being 45 degrees from horizontal.

16. A method for replacing a backplane card mounted in a back side of a drive cage, the drive cage containing a plurality of hard disk drive (HDD) devices mounted in a front side of the drive cage, comprising the steps of:

a) providing a frame having a front face;

b) providing at least one guide rail mounted on the frame;

c) connecting a plate to the at least one guide rail such that the plate is capable of sliding into and out of the front face of the frame via the at least one guide rail, the plate having a first portion and a second portion, the first portion being connected to the second portion via a linking element, wherein the linking element is a hinge assembly;

d) mounting the device cage on the first portion of the plate, wherein the front side of the device cage faces the front face of the frame;

e) sliding the front portion of the plate out of the front face of the frame such that the device cage is outside of the frame;

f) locking the plate in position with a cage removal spring mounted on the second portion of the plate;

g) rotating the front portion of the plate downward via the linking element such that the back side of the device cage is accessible; and h) replacing the backplane card.

17. The method of claim 16, wherein rotating step (g) further includes:

(g1) rotating the first portion of the plate from a first position to a second position, the first position being horizontal and the second position being 45 degrees from horizontal.

18. The method of claim 17, wherein the hinge assembly includes a detent mechanism, and rotating step (g1) further includes:

(g1a) while in the first position, applying pressure to the first portion of the plate in order to overcome the detent, thereby allowing the first portion to rotate to the second position.

19. The method of claim 16, wherein sliding step (e) further includes:

(e1) removing each of the plurality of HDD devices from the front side of the drive cage; and (e2) unlocking a spring latch mechanism mounted on the device cage, the spring latch mechanism for preventing the device cage from sliding out of the frame if at least one HDD device is mounted in the device cage.

20. The method of claim 19, further including the steps of:

i) returning the front portion of the plate to the first position;

j) unlocking the back portion of the plate by releasing the cage removal spring;

k) sliding the first portion of the plate back into the front face of the frame; and l) installing the HDD devices.

21. A two level direct access and storage device (DASD) drive cage assembly, comprising:

a frame having a front face;

a plate, the plate having a first portion and a second portion, wherein the plate can be moved into and out of the front face of the frame;

a linking element for coupling the first portion second portion, wherein the linking element is a hinge assembly;

an upper DASD drive cage, the upper drive cage mounted to the frame; and a lower DASD drive cage, the lower drive cage mounted on the first portion of the plate, wherein the first portion of the plate is capable of moving out of the front face of the frame and rotating downward, such that the lower device cage is accessible.

22. The assembly of claim 21 further comprising at least one guide rail mounted on the frame, wherein the plate is coupled to the at least one guide rail and slides into and out of the frame on the at least one guide rail.

23. The assembly of claim 21, wherein the hinge assembly allows the first portion of the plate to rotate from a first position to a second position.

24. The assembly of claim 23, wherein the hinge assembly includes a detent mechanism, wherein the detent mechanism prevents the first portion from rotating to the second position until pressure is applied to the first portion of the plate.

25. The assembly of claim 24, wherein the second position being 45 degrees from horizontal.

26. The assembly of claim 21, wherein the cage includes a front side and a back side, the assembly further comprising:

a backplane card mounted in the back side of each of the upper and lower device cages; and a plurality of hard disk drive (HDD) devices mounted in the front side of each of the upper and lower device cages.

27. The assembly of claim 26, further including a spring latch mechanism mounted to the lower device cage, the spring latch mechanism for preventing the lower device cage from moving out of the frame if at least one HDD device is mounted in the front side of the lower device cage.

28. The assembly of claim 21, further including a cage removal spring mounted on the second portion of the plate, wherein the cage removal spring locks the second portion of the plate in place when the first portion of the plate is outside of the frame.

* * * * *